(12) United States Patent
Ichikawa et al.

(10) Patent No.: US 6,990,922 B2
(45) Date of Patent: Jan. 31, 2006

(54) INDICATION SYSTEM OF METER PART

(75) Inventors: Tadaoki Ichikawa, Aichi (JP); Toshinori Takahashi, Aichi (JP); Mitsuhiro Nawashiro, Aichi (JP); Norihito Kino, Aichi (JP); Hiroshi Ito, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/283,069

(22) Filed: Oct. 30, 2002

(65) Prior Publication Data

US 2003/0079671 A1   May 1, 2003

(30) Foreign Application Priority Data

Oct. 31, 2001 (JP) .......................... P2001-334241
Mar. 4, 2002 (JP) .......................... P2002-057911

(51) Int. Cl.
*G01D 11/28* (2006.01)

(52) U.S. Cl. .............................. 116/286; 116/DIG. 36; 116/287; 116/288; 362/231; 362/23; 362/84; 345/22

(58) Field of Classification Search ................ 116/286, 116/DIG. 35, DIG. 36, 287, 288, 62.1, 305, 116/298; 340/286.01; 345/22, 35, 72, 83; 362/231, 230, 23, 29, 30, 28, 84; 40/446
See application file for complete search history.

(56) References Cited

U.S. PATENT DOCUMENTS

| 3,930,459 | A | * | 1/1976 | Barrow ........................... 116/2 |
| 4,257,084 | A | * | 3/1981 | Reynolds ...................... 362/31 |
| 4,970,400 | A | * | 11/1990 | Muramatsu .............. 250/463.1 |
| 4,975,807 | A | * | 12/1990 | Ohashi ........................ 362/23 |
| 5,117,334 | A | * | 5/1992 | Kameda ....................... 362/28 |
| 5,130,548 | A | * | 7/1992 | Sano et al. .............. 250/461.1 |
| 5,821,867 | A | * | 10/1998 | Angell et al. .......... 340/815.45 |
| 5,938,311 | A | * | 8/1999 | Takao et al. .................. 362/26 |
| 5,949,346 | A | * | 9/1999 | Suzuki et al. .......... 340/815.45 |
| 5,975,728 | A | * | 11/1999 | Weyer ........................ 362/489 |
| 5,977,868 | A | * | 11/1999 | Itakura ....................... 340/438 |
| 6,379,015 | B2 | * | 4/2002 | Wilhelm et al. ............. 362/23 |
| 6,408,784 | B1 | * | 6/2002 | Ross ........................... 116/288 |
| 6,499,852 | B1 | * | 12/2002 | Kino et al. .................. 362/23 |
| 6,575,607 | B1 | * | 6/2003 | Klemish et al. ............ 362/489 |
| 6,693,523 | B1 | * | 2/2004 | Abel et al. .................. 340/461 |
| 6,729,738 | B2 | * | 5/2004 | Fuwausa et al. ............. 362/84 |
| 6,820,991 | B2 | * | 11/2004 | Wakaki et al. ................ 362/27 |

* cited by examiner

*Primary Examiner*—Christopher W. Fulton
*Assistant Examiner*—Tania Courson
(74) *Attorney, Agent, or Firm*—McGinn IP Law Group, PLLC

(57) ABSTRACT

This invention is to offer an indication system and method of a meter part having excellent visibility and designing property. A light is irradiated from the first light source toward the indicating panel from the side of the indicating face for making the background part of the indicating panel luminous with a complementary color to a color indicating the indicator part of pointers, graduations, numerals and others.

11 Claims, 2 Drawing Sheets

INDICATION SYSTEM OF METER PART

The present application is based on Japanese Patent Applications Nos. JP 2001-334241 and JP 2002-57911, which are incorporated herein by reference.

BACKGROUND OF THE INVENTION

1. Field of the Invention

The present invention relates to an indication system of a meter part (meter apparatus). The invention is applicable to meter parts of automobiles, electric automobiles, or air crafts, and in particular, suitably applied to meter parts such as combination meters of automobiles.

2. Related Art

Aiming at improving visibility and designing property of the meter parts (such as combination meter) of automobiles, it has been practiced to emit lights of desired colors for indicating respectively indicating parts (numerals, graduations, various warnings, pointers and others) on an indicating panel. For example, such structures are employed where numerals and graduations are indicated with the same grouped colors to create a unified feeling, while pointers are indicated with different colors to heighten the visibility thereof, and warning indications are indicated with colors in response to information issued therefrom.

The visibility of the meter part has been heightened by making the indicating part of the indicating panel luminous as mentioned above, but in regard to the background of the indicating panel (parts other than the indicating part), in general no illumination is performed in order to make luminescence prominent around the indicating part (that is, not emitting light). In such a structure, the indicating part is indicated with a luminescent color specific to the background in black. Structures illuminating the background with white group or red group colors have been employed in some quarters, but since the illumination of the background is reduced to practice, mainly paying attentions to the designing property, the visibility around the indicating part, in turn, goes down owing to preference to the designing property. For example, the background is illuminated with colors as white for introducing the light to a meter needle, but since the background has a bright color, contrast between both is too small to obtain the enough visibility.

On the other hand, for securing high safety and satisfying user's request for high designing property, it has been desired to more heighten the visibility and designing property of the meter part.

SUMMARY OF THE INVENTION

For satisfying the above requirements, it is an object of the invention to offer an indication system of a meter part having excellent visibility and designing property.

The invention has been realized to accomplish the above mentioned object, and has the following structure, that is, an indication system of a meter part, comprising:

an indicating panel including an indicator part luminous with an indicating color and a background part; and a first light source for irradiating light toward the indicating panel from a side of an indicating face with respect to the indicating panel;

wherein the background part is illuminated by the first light source with a complementary color to the indicating color of the indicator part.

In such a structure, the background of the indicating part is made luminous with a complementary color to the indicating color of the indicator part by the first light source. In other words, the indicating part is indicated with a specific indicating color, and at the same time, the background is luminous with the complementary color to the indicating color of the indicator part. Because the indicating part and the background are indicated with the colors in relation of the complementary color, the mutual colors are made prominent, whereby the visibility of the indicating part is made very high. Not only the indicating part but also the background part are indicated by the specific colors, so that the designing property of the whole meter part is improved. Namely, also in the designing property, a very well indication is performed to the meter part.

Further the invention provides an indication method of a meter part, characterized by the indicator part of the indicating panel luminous with the first color, and irradiating the light from the first light source toward the indicating panel from the side of the indicating face, so that the background part of the indicating panel is luminous with a second complementary color to the first color.

The indicating panel is furnished with the indicating part and the background part. The indicating part referred to herein includes the numerals, graduations, warnings and pointers used for indicating information of the meter part. The present description also regards the pointer as the meter indicator as ones of the indicating parts in the indicating panel. On the other hand, the background part referred to herein designates parts other than the indicating part in the indicating face (observing face) of the indicating panel. For example, the indicating panel may be structured by combining the pointer and a dial plate having parts of colored layers as indicating the numerals, graduations, and warning notices with the respectively specific colors.

The first light source is installed at the side of the indicating face (the side of an observing face) of the indicating panel, and a light is irradiated toward the indicating panel from the light source. This light makes the background part of the indicating panel luminous with the complementary color to the indicating color of the indicator part. The complementary color is meant herein by a color placing at an opposite position in a hue circle. For example, a complementary color of red is blue or green, and a complementary color of yellow is blue or blue-purple.

Among colors in the complementary relationship, it is desirable from the viewpoint of improving the visibility to select warm colors as an indicating color for the indicating part and to select cold colors (cool colors) as a luminescent color for the background. For example, the indicating part is indicated with red, orange or yellow group colors, and the background part is made luminous with blue, blue-green or green group colors. In particular, it is desirable from the viewpoint of the visibility and the designing property to indicate the indicating part with orange group colors and make the background part luminous with blue group colors.

By the way, the indicating part includes numerals, graduations and others as mentioned above, and all of them are not always indicated with the same colors. Accordingly, taking the designing property into consideration, the luminescent color for the background part is selected on the basis of standard of the indicating part demanding to heighten the visibility by an effect of the complementary color with the background part, namely, either indicating part (in case a plurality of indicating parts are indicated with the same color, "either indicating part" is meant by said plurality of indicating parts). For example, an especially high visibility is required to the meter indicator, and therefore it is desirable to select the luminescent color of the background part on the standard of the meter indicator.

For the first light source, such a light source is employed which can make the background luminous with the complementary color to the color of the indicator part of the indicating panel. For instance, a light source directly emitting the color in the relationship of such a complementary color may be used as the first light source. If performing a color-exchange on the light emitted from the first light source, otherwise on the light emitted from the background by receiving the light from the first light source, a color of the light finally viewed can be made the complementary color to the color of the indicator part. For instance, if installing a color-changing layer at a place between the first light source and the indicating panel, or between the indicating panel and a driver, the color-exchange is available. Further, if containing the phosphor in the background part of the indicating panel and radiating a light enabling to excite said phosphor from the first light source, a desired light can be emitted owing to fluorescent action. Such a case adopts the first light source enabling to emit a light within an ultraviolet range suited to excite the phosphor. According to this structure, the light from the first light source is not directly viewed or difficult to be viewed, so that it is possible to avoid an unwanted illumination therearound by leakage of the first light source. In particular, by coloring the indicating part with the light from the first light source, it is possible to avoid indication of the indicating part with a different color from an inherent color. But note that this does not avoid utilization of a part of the light from the first light source to the indication (coloring) of the indicating part.

No especial limitation is made to a phosphor-containing embodiment when containing the phosphor in the background part. If forming a phosphor layer on the surface of the background part of the indicating panel, otherwise directly mixing the phosphor in a material for forming the indicating panel, the phosphor can be contained in the background part of the indicating panel. As to sorts of the phosphors, such sorts are employed that the color of the light emitting from the background part of the indicating panel finally has the luminescent complementary color to the color of the indicator part.

The sorts of the available phosphor are not especially limited, and known ones may be appropriately selected and used, irrespective of inorganic and organic groups. If using the inorganic phosphors, a luminescence having a matting feeling is obtained. In contrast, if using the organic phosphors, a luminescence having a clear feeling is obtained.

As the inorganic phosphors, the following may be employed, for example, those having the red grouped luminescent colors of $6MgO \cdot As_2O_5:Mn^{4+}$, $Y(PV)O_4:Eu$, $CaLa_{0.1}Eu_{0.9}Ga_3O_7$, $BaY_{0.9}Sm_{0.1}Ga_3O_7$, $Ca(Y_{0.5}Eu_{0.5})(Ga_{0.5}In_{0.5})_3O_7$, $Y_3O_3:Eu$, $YVO_4:Eu$, $Y_2O_2:Eu$, $3.5MgO \cdot _{0.5}MgF_2GeO_2:Mn^{4+}$, and $(Y.Cd)BO_2:Eu$;

the blue grouped phosphors expressed with $(Ba, Ca, Mg)_5(PO_4)_3Cl:Eu^{2+}$, $(Ba, Mg)_2Al_{16}O_{27}:Eu^{2+}$, $Ba_3MgSi_2O_8:Eu^{2+}$, $BaMg_2Al_{16}O_{27}:Eu^{2+}$, $(Sr, Ca)_{10}(PO_4)_6Cl_2:Eu^{2+}$, $(Sr, Ca)_{10}(PO_4)_6Cl_2 \cdot nB_2O_3:Eu^{2+}$, $Sr_{10}(PO_4)_6Cl_2:Eu^{2+}$, $(Sr, Ba, Ca)_5(PO_4)_3Cl:Eu^{2+}$, $Sr_2P_2O_7:Eu$, $Sr_5(PO_4)_3Cl:Eu$, $(Sr, Ca, Ba)_3(PO_4)_6Cl:Eu$, $SrO \cdot P_2O_5 \cdot B_2O_5:Eu$, $(BaCa)_5(PO_4)_3Cl:Eu$, $SrLa_{0.95}Tm_{0.05}Ga_3O_7$, $ZnS:Ag$, $GaWO_4$, $Y_2SiO_6:Ce$, $ZnS:Ag, Ga, Cl$, $Ca_2B_4OCl:Eu^{2+}$, $BaMgAl_4O_3:Eu^{2+}(M1, Eu)_{10}(PO_4)_6Cl_2$, (M1 is at least one element selected from Mg, Ca, Sr and Ba); and the green grouped phosphors of $Y_3Al_5O_{12}:Ce^{3+}$(YAG), $Y_2SiO_5:Ce^{3+}$, $Tb^{3+}$, $Sr_2Si_3O_8 \cdot 2SrCl_2:Eu$, $BaMg_2Al_{16}O_{27}:Eu^{2+}$, $Mn^{2+}$, $ZnSiO_4:Mn$, $Zn_2SiO_4:Mn$, $LaPO_4:Tb$, $SrAl_2O_4:Eu$, $SrLa_{0.2}Tb_{0.8}Ga_3O_7$, $CaY_{0.9}Pr_{0.1}Ga_3O_7$, $ZnGd_{0.8}HO_{0.2}Ga_3O_7$, $SrLa_{0.6}Tb_{0.4}Al_3O_7$, $ZnS:Cu, Al$, $(Zn, Cd)S: Cu, Al$, $ZnS:Cu, Au, Al$, $Zn_2SiO_4:Mn$, $ZnSiO_4:Mn$, $ZnS:Ag, Cu$, $(Zn.Cd)S:Cu$, $ZnS:Cu$, $GdOS:Tb$, $LaOS:Tb$, $YSiO_4:Ce.Tb$, $ZnGeO_4:Mn$, $GeMgAlO:Tb$, $SrGaS:Eu^{2+}$, $ZnS:Cu.Co$, $MgO \cdot nB_2O_3:Ge, Tb$, $LaOBr:Tb, Tm$ and $La_2O_2S:Tb$.

In addition, it is possible to use $YVO_4:Dy$ having the white group luminescent color s and $CaLu_{0.5}Dy_{0.5}Ga_3O_7$ having the yellow group luminescent colors.

As the organic phosphor, the followings may be adopted. For example, stilbene based colors such as 1,4-bis (2-methyl styryl) benzen (Bis-MSB), or trans-4,4'-diphenyl stilbene (DPS), coumarin based colors such as 7-hydroxy-4-methyl coumarin (coumarin 4), or BOQP, PBBO, BOT, or POPOP may be employed. These phosphor shave blue group fluorescent colors. Further available are DPOT, brilliant sulfoflavine FF, basic yellow-HG, SINLOIIIHI COLOR FZ-5005 (made by Sinloihi Co., Ltd.). These phosphors have fluorescent colors from yellow to green based groups, and are also phosphors of from yellow to red colors. Eosine, rhodamine 6G, rhodamine B, or NKP-8303 (made by Nippon Fluorescent Chemical Co., Ltd.) are also usable. TB (EDTA) SSA, or EuTTA are dissolved in, e.g., methylmethacrylate, polymerized and solidified into polymethylmethacrylate (PMMA), and this substance may be used. In addition, a combination of more than different two sorts of phosphors is also available.

The indicator part is contained with the phosphor, so that the indicator part may be indicated by making use of fluorescence from the phosphor. In this case, selected are colors having the complementary relationship between the phosphor contained in, e.g., the indicator part and the luminescent color of the phosphor contained in the background part. Thereby, receiving the light from the first light source, the indicator part and the background part are indicated by fluorescence from the respectively specific phosphors, and the indicating colors of both have the relationship of the complementary colors.

The indicating panel having the background part containing the phosphor may be produced, for example, as follows. A material of light non-permeable such as resin of black color group is made thin plate so that the indicator part is punched out, and surfaces other than the indicator part are formed with layers containing the phosphor. The layer is formed by coating a paint or resin containing the phosphor or pasting a tape or sheet.

The sorts of the first light source are not especially limited, but the LED or bulb may be used. The adoption of the LED is desirable from the under viewpoint. Having a small size, the LED can realize miniaturization of the whole system. Being small in a heating value, the LED has an advantage of lowering heat influences to surrounding members (for example, a member installed with the first light source). A driving electric power is small, and a service life is long. No especial limitation is made to the sorts of the LED, so that various types of LEDs may be adopted such as a round type, or chip type. From the viewpoint of the miniaturization, the adoption of the chip typed LED is preferable. As the LED, those may be enumerated which employ as a material of semi-conductor of III group nitride based compound. By using a plurality of light sources and controlling them, the luminescent color can be changed.

The first light source may be plural. In this case, the light sources of different sorts and different luminescent colors may be used. If lighting is controlled by using the light sources of different luminescent colors, such luminous embodiment may be obtained which emit a plurality of lights to the background part. For example, using the LEDs mounted with the luminous elements of respective red, green, and blue on one substrate and controlling the luminous embodiments of the respective luminous elements, the background part can be made luminous with desired colors.

The light source emitting both lights of the visible range and an ultraviolet range may be employed. Using such a light source, if the phosphor is contained in the background part of the indicating panel, it is possible to emit from the background part the fluorescence emitted from the phosphor by the light of the ultraviolet range and the light mixed with the light of the visible range of the light source itself. If the phosphor is contained in the only one part of the background part, this part can observe the light mixed with the fluorescence from the phosphor and the light of the visible range of the light source, and another part can obtain the luminescence resulted from the only light from the visible range of the light source. The part of the background part can be made luminous in a different color, and can be utilized as one of variations of the luminous embodiment.

The place of installing the first light source is not especially limited as far as the light can be irradiated toward the indicating panel from the side of the indicating face. Taking as an instance a case of applying the invention to the meter part of the passenger motorcar, the first light source is installed at a part of an indicator panel that is so formed as to protect the meter part for avoiding incidence of the light coming from a front part. Further the first light source may be installed at a part of the indicator panel which is situated on a lower portion of the meter part.

The indication of each indicator part of the indicating panel can be carried out by a second light source 90 (see FIG. 1) provided separately from the first light source. For example, the second light source is installed at the rear side of the indicating panel, and if the light from the second light source is taken out from an optical window (for example, a penetrating hole or a window made of a light permeable resin) equipped in the indicating panel to the side of the indicating face, each of the indicator parts is made luminous for indication.

It is preferable to adjust both emitting embodiments of the background and the indicator part so that brightness of the indicator part is made higher than that of the background. In such a manner, the indicator part is more emphasized to indicate and heighten the visibility.

Further explanation will be made to the structure of the invention by use of actual examples.

Figure 1:
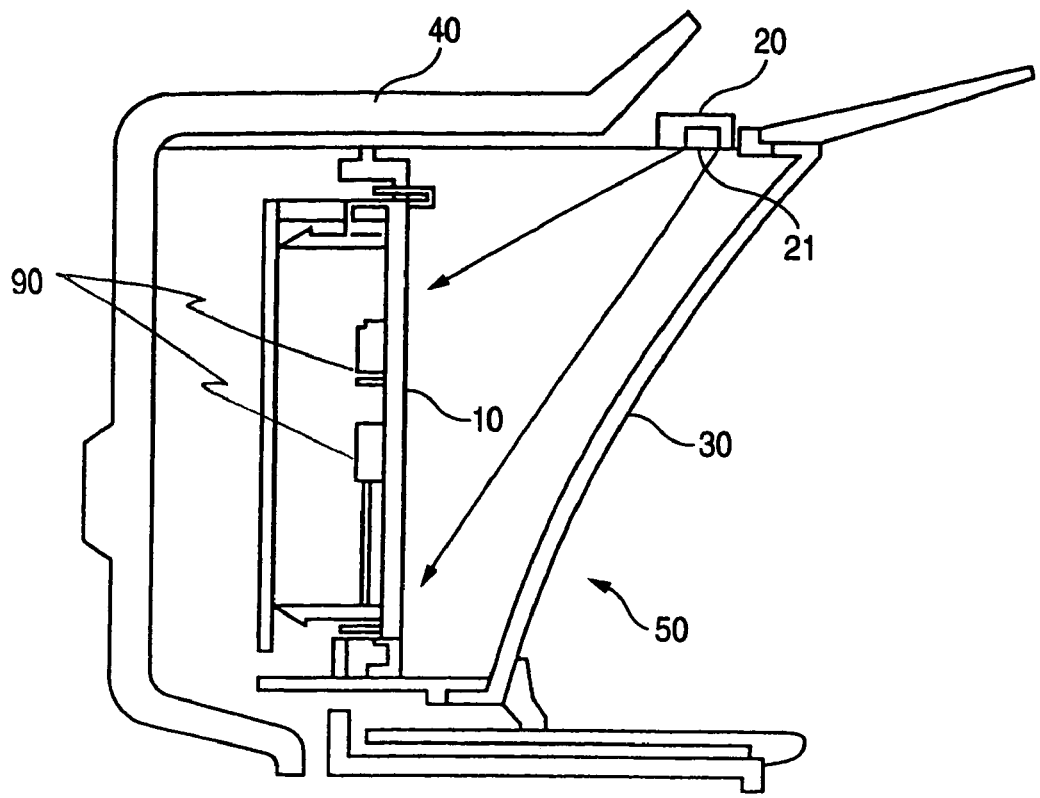
FIG. 1 is a view showing an indication system as a first embodiment, which is a cross sectional view of an automobile indicator panel.

FIG. 1 is a view showing an embodiment applying the indication system of the meter part of the invention to the meter part of a motorcar, and showing a cross sectional embodiment of an indicator panel 40 furnished with a meter apparatus 50 therein.

Figure 2:
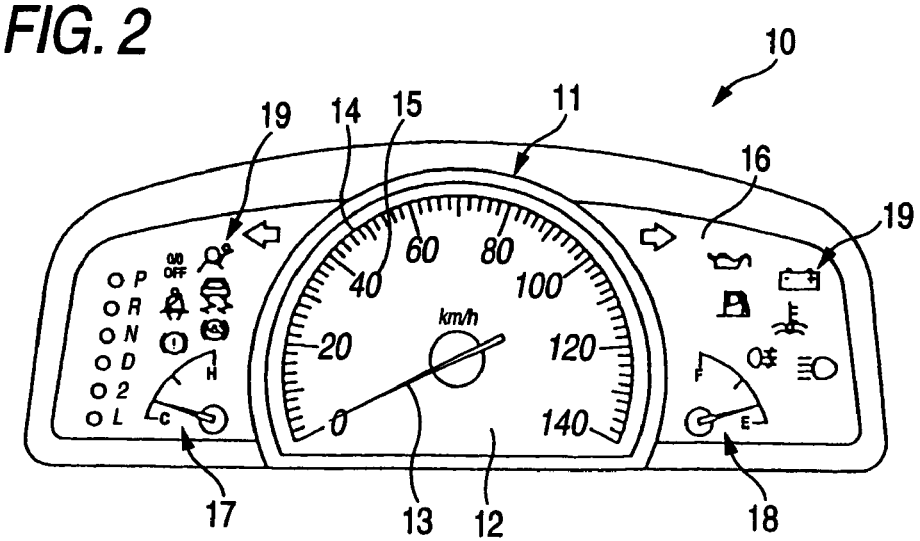
FIG. 2 is a front view of a dial panel.

FIG. 2 is a front view of a dial panel (the indicating panel) 10 composing the meter apparatus 50.

An illumination system of the meter part of this embodiment comprises in brief the dial plate 10 and a light source unit 20. As seen in FIG. 2, in the dial plate 10, there are a central speedometer 11, thermometer 17, fuel gauge 18 and warning lights 19. The background 12 (other range than a speed meter needle 13, graduations 14, and numerals-signs 15) of the speedometer 11 has a white surface. On the other hand, the background 16 other than the speedometer 11 of the dial plate 10 has a black surface. Such a dial plate 10 is formed by printing a white paint and a black paint on the surface of the light permeable panel. That is, a thin plate-like panel of the light permeable resin gets ready, and the range for forming the speedometer 11 is printed with the white paint, and the other range is printed with the black paint in such a manner that the respective indicator parts (graduations 14, numerals-signs 15, and warning lights 19) are left as being punched out. On this formed dial plate 10, a pointer as the speedometer needle 13 of the light permeable resin is attached.

By the way, the speedometer 11 and the other parts may be made as separate bodies of a white material and a black material, respectively. Alternatively, the dial plate 10 may be made as one body by means of a two-color forming mold using the white material and the black material.

The dial plate 10 is installed at the rear side thereof with a substrate mounting a plurality of LEDs for making the respective indicator parts as the speedometer 13, graduations 14 and others luminous with the specific colors. The present embodiment uses the LED of the orange luminescent color for making the speedometer needle 13 luminous, the LED of the red luminescent color for making the graduations 14 and numerals 15 luminous, and as to other indicator parts (the warning indications 19 and others) the embodiment uses the LED (for example, LED of red or orange color for warning an oil lamp, battery lamp) suitable to information issued from the respective indicator parts.

The indicator parts of the graduations 14, numerals-sings 15 and others are contained with the phosphor, and if emitting the light enabling to excite the phosphor from the rear side of the dial plate 10, it is also possible to make the respective indicator parts luminous for indication with the specific colors through fluorescence issued from the phosphor. Also in regard to the pointers as the speedometer needle 13, if providing the phosphor layer on the surface or creating the pointer of a material containing the phosphor, the fluorescent action is utilized for making it luminous for indication.

The light source unit 20 holds therein a LED 21 in a blue color, and is placed for irradiating the light to the dial plate 10 from a front upper part, and further determined with respect to the irradiating range for irradiating the light from the LED 21 to the whole of the speedometer 11. In this embodiment, taking positional fluctuations into consideration when setting up the dial plate 10 and the light source unit 20, the irradiation is effected to a slightly wider range than that of the speedometer 11.

Numeral 30 designates a light permeable cover for avoiding invasion of dusts into the meter apparatus 50.

Next, the indicating embodiment will be explained. At first, the LED placed at the rear side of the dial plate 10 is lighted in cooperation with lighting of a side marker lamp, and the speedometer needle 13 of the speedometer 11, graduations 14, and numeral-sign 15 are made luminous with the respective indication colors. Namely, the speedometer needle 13 is indicated in orange and the graduations 14 and the numeral-sign 15 are red. Concurrently, the LED 21 of the light source unit 20 is lighted to emit the light to the speedometer 11. Thereby, the background part 12 of the speedometer 11 is indicated in blue. Accordingly, in the speedometer 11, the speedometer needle 13 is indicated in orange against the blue color, and the graduations 14 and the numeral-sign 15 are indicated in red. Herein, the orange group colors for indicating the speedometer needle 13 and the blue group colors for the background part 12 are in the relationship of the complementary colors, and therefore, the contrast of both is very high. Owing to this high contract, the visibility of the speedometer needle 13 goes up very much. Similarly, the red group colors for indicating the graduations 14 and the numeral-sign 15 and the blue group colors of the background part 12 are in the relationship of the complementary colors, and therefore, the contrast of both is very high. The visibility of the graduation 14 and the numeral-sign 15 goes up very much.

The blue group colors belonging to the so-called cold color are arranged as colors emitting the background part 12, and the orange or red group colors belonging to the so-called warm color are arranged as colors indicating the speedometer needle 13 for issuing information (i.e., speed indication), so that the speedometer needle 13 and others are indicated more prominently, and consequently, effective information can be performed.

Further, since the background 16 other than the speedometer 11 is formed with the black group color, even if the light issued from the LED 21 is irradiated, this range is scarcely observed. This fact signifies that the speedometer 11 is indicated prominently than other ranges and that the indication is effective without spoiling the designing property of other ranges.

As mentioned above, the speedometer needle 13, graduations 14 and numerals-signs 15 of the speedometer 11 are all indicated at high contrast in relation with the background part 12. Therefore, the speedometer is indicated at the very high visibility. In addition, since such a design is composed which is arranged with colors of high contrast relationship, the speedometer is indicated with excellent designing property.

In the above embodiment, the speedometer needle 13, graduations 14 and numerals-signs 15 are made luminous with different colors, but the luminescence is enough with the same color. For instance, all of them may be luminous with the orange color.

Further, the contrast (difference in illumination or difference in brightness) between the indicator part as the meter needle 13 and the background part may be varied at low speed time and high speed time, or at rotations of low speed and high speed of a tachometer. Specifically, when a traveling speed of the automobile increases (for example, when exceeding 100 km/h, when the tachometer goes into a red zone, or when the condition being under the red zone is kept for a certain time), the brightness of the background part 12 goes down, the difference in illumination (the difference in brightness) between the indicator part and the background part can be emphasized. In such a way, the visibility of the indicator part is more heightened at the high speed, and for example, it is possible to effectively notify a driver of a dangerous situation of speed-up more than necessarily. Instead of lowering the brightness of the background part 12, the brightness of the indicator part may be heightened. It is of course possible to concurrently decrease the brightness of the background part 12 and increase the brightness of the indicator part.

The contrast of the indicator part and the background part 12 may be also linearly varied in company with increasing of the traveling speed. Further, when exceeding the specific speeds as 20, 40 or 60 km, the contrast of both may be varied stepwise.

Figure 3:
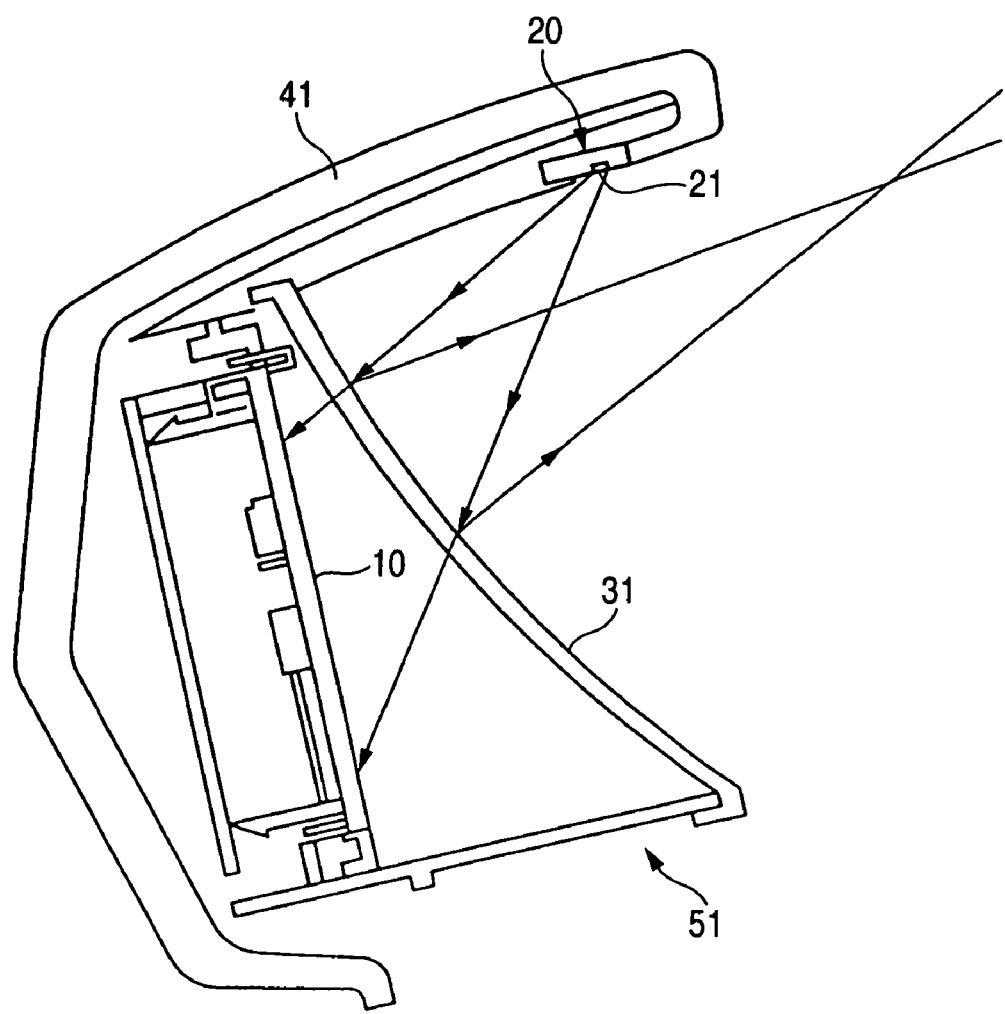
FIG. 3 is a view showing the indication system as another embodiment, which is a cross sectional view of an automobile indicator panel.

Next, another example will be referred to. FIG. 3 is a view showing a structure of an indication system of this other example illustrating a cross sectional embodiment of the indicator panel part installed with a meter apparatus. This embodiment is an example of applying the invention to a different structure from that of the above mentioned embodiment. The same members as those said above will be given the same numerals to omit explanations.

This embodiment provides the light source unit 20 outside (the side of the driver) of the cover. Accordingly, a part of the light emitted from the light source unit 20 is reflected to the driver's side by the cover 31. Therefore, the position of the light source unit 20 and the irradiating range are determined such that the reflected light is not directly attacked to the driver. Similarly, the shape and position of the cover 31 are also determined.

Thus, in addition to the range of the light irradiating the dial plate 10 and taking the reflection by the cover 31 into consideration, the position and the irradiating range of the light source unit 20 are set. Thereby, such effects are obtained which improve the visibility and the designing property in the dial plate similarly to the above embodiment, and at the same time avoid the light from the light source unit 20 directing through reflection by the cover 31.

The invention is not defined by the explanation of the above embodiments at all. In particular, not getting out from the aspect of the invention and getting in the range those skilled in the art can easily accomplish, various modified embodiments fall in the scope of the invention.

What is claimed is:

1. An indication system of a meter part, comprising:
   an indicating panel including an indicator part luminous with an indicating color, and a background part; and
   a first light source for irradiating light toward the indicating panel from a side of an indicating face with respect to the indicating panel,
   wherein the background part is illuminated by the first light source and is luminous with a complementary color to the indicating color of the indicator part, and
   wherein one of said indicating color and said complementary color comprises a warm group color, and the other comprises a cold group color,
   wherein the illumination system is adapted to a vehicle, and
   wherein a contrast in luminous intensity between the indicator part and the background part varies in accordance with a running speed of the vehicle.

2. An indication system of the meter part as set forth in claim 1, wherein one of said indicating color and said complementary color comprises red, and the other comprises green.

3. An indication system of the meter part as set forth in claim 1, wherein one of said indicating color and said complementary color comprises orange, and the other comprises blue.

4. An indication system of the meter part as set forth in claim 1, wherein the background part comprises a phosphor, and the first light source emits light of wavelength exciting the phosphor.

5. An indication system of the meter part as set forth in claim 1, wherein said panel comprises a punched-out portion corresponding to said indicator part.

6. An indication system of the meter part as set forth in claim 5, further comprising:
   a second light source disposed on a side of said indicating panel which is opposite to said indicating face, said second light source illuminating said indicator part through said punched-out portion.

7. An indication system of the meter part as set forth in claim 6, wherein said indicator part comprises a plurality of indicator parts, and said punched-out portion comprises a plurality of punched-out portions which correspond respectively to said plurality of indicator parts.

8. An indication system of the meter part as set forth in claim 6, wherein said second light source comprises a plurality of second light sources, and
wherein said indicator part comprises a phosphor, and light from said second light source excites said phosphor.

9. An indication system of the meter part as set forth in claim 1, wherein said first light source comprises a blue light-emitting diode (LED).

10. An indication system of the meter part as set forth in claim 1, wherein said first light source emits light having said complementary color.

11. An indication system of the meter part as set forth in claim 1, wherein one of said indicating color and said complementary color comprises yellow, and the other comprises blue-purple.

* * * * *